(12) United States Patent
Olson et al.

(10) Patent No.: US 10,545,846 B2
(45) Date of Patent: Jan. 28, 2020

(54) IDENTIFYING AND CORRECTING SUBOPTIMAL STORAGE-RECLAMATION PROCESSES

(71) Applicant: International Business Machines Corporation, Armonk, NY (US)

(72) Inventors: James E. Olson, Seymour, CT (US); Mu Qiao, Belmont, CA (US); Ramani R. Routray, San Jose, CA (US); Alan C. Skinner, Portsmouth (GB); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 15/461,595

(22) Filed: Mar. 17, 2017

(65) Prior Publication Data

US 2018/0267709 A1     Sep. 20, 2018

(51) Int. Cl.
*G06F 12/00*     (2006.01)
*G06F 11/30*     (2006.01)

(52) U.S. Cl.
CPC ............................. *G06F 11/3034* (2013.01)

(58) Field of Classification Search
CPC ............ G06F 11/3034; G06F 11/3006; G06F 11/3438; G06F 11/3452
See application file for complete search history.

(56) References Cited

U.S. PATENT DOCUMENTS

| | | | |
|---|---|---|---|
| 6,304,880 B1 | 10/2001 | Kishi | |
| 8,635,422 B1 | 1/2014 | Kaliannan et al. | |
| 8,639,807 B2 | 1/2014 | Sims | |
| 8,959,305 B1 | 2/2015 | Lecrone et al. | |
| 9,003,240 B2 | 4/2015 | Rhee et al. | |
| 9,251,050 B2 | 2/2016 | Baldwin et al. | |
| 2013/0275593 A1* | 10/2013 | Tseitlin | G06F 9/5022 709/226 |
| 2014/0181585 A1* | 6/2014 | Hoang | G06F 11/3034 714/26 |
| 2014/0181595 A1* | 6/2014 | Hoang | G06F 11/3034 714/47.3 |

(Continued)

*Primary Examiner* — Prasith Thammavong
(74) *Attorney, Agent, or Firm* — Schmeiser, Olsen & Watts; Christopher K. McLane (57) ABSTRACT

A method and associated systems for identifying and correcting suboptimal storage-reclamation processes. A storage-management system uses information received in system-generated storage-reclamation reports to assign each user a set of reclamation scores. Each score identifies how effectively the user has been able to reclaim lost storage at particular times. These scores are organized into user-specific profiles that each consists of a chronological sequence of one user's scores. If a user's profile is "good" (that is, if the user's scores are consistently high) or "improving" (if scores are increasing over time), the system then determines whether that user's reclamation efforts have successfully reduced the amount of reclaimable storage controlled by the user. If not, the system infers that a suboptimal storage-reclamation process interfered with the user's reclamation efforts. The system then undertakes corrective action to identify and resolve the cause of the suboptimal process.

20 Claims, 3 Drawing Sheets

(56) References Cited

U.S. PATENT DOCUMENTS

2014/0372807 A1* 12/2014 Poola .................. G06F 11/3452
714/39
2015/0309748 A1   10/2015 Haustein et al.
2017/0308449 A1* 10/2017 Mangione-Tran ...... G06F 3/067

* cited by examiner

FIG. 3

IDENTIFYING AND CORRECTING SUBOPTIMAL STORAGE-RECLAMATION PROCESSES

BACKGROUND

The present invention pertains to computerized storage management and in particular to the reclamation of reclaimable storage by analyzing user behavior.

Reclaimable storage is storage that appears to a storage-management system to be in use, but which is not actually being used. This may happen when, for example, a process or program terminates unexpectedly. If the process or program had no chance to release storage that it had been using, the operating system or other storage-management facility may not be aware that the storage is no longer in use.

System-maintenance tools and storage-management systems may be configured to automatically detect and sometimes automatically reclaim reclaimable storage. These functions may comprise mechanisms known in the art, such as notifying an operating system that reclaimable disk sectors should be tagged as being available or moved to a pool of available storage.

In some cases, such tools may generate a storage-reclamation report that lists all known reclaimable storage. Such a report may allow a system administrator or maintenance specialist to confirm the existence of the reported reclaimable storage before authorizing or manually performing reclamation. In other cases, a reclamation tool may itself automatically attempt to reclaim storage reported as being reclaimable without human intervention.

BRIEF SUMMARY

An embodiment of the present invention provides storage-management system comprising a processor, a memory coupled to the processor, and a computer-readable hardware storage device coupled to the processor, the storage device containing program code configured to be run by the processor via the memory to implement a method for identifying and correcting suboptimal storage-reclamation processes, the method comprising:

receiving, by the processor, a reclamation report comprising reclamation statistics that span a period of time, where a first statistic of the reclamation statistics identifies:

a first user of a set of users, a time t1 that is comprised by the period of time, a first cumulative amount of reclaimable storage controlled by the first user, where the first cumulative amount of reclaimable storage consists of one or more logical units of storage identified by the first statistic as being reclaimable during a portion of the period of time ending at time t1, a first cumulative amount of reclaimed storage that has been reclaimed by the first user from the first cumulative amount of reclaimable storage during the portion of the period of time, and a first cumulative reclamation percent equal to the first cumulative amount of reclaimed storage divided by the first cumulative amount of reclaimable storage;

classifying, by the processor, as a function the reclamation statistics, attempts by each user of the set of users to reclaim reclaimable storage during the period of time as being good, bad, improving, or declining;

determining, by the processor, as a function of the classifying, that the first user has, during the period of time, made good or improving attempts to reclaim at least one logical unit of reclaimable storage;

further determining, by the processor, that the first user has failed to reduce the first user's cumulative reclamation percent during the period of time;

identifying, by the processor, in response to the further determining, a suboptimal storage-reclamation process capable of causing the first user's failure to reduce the first user's cumulative reclamation percent during the period of time; and rectifying, by the processor, the suboptimal storage-reclamation process.

Another embodiment of the present invention provides method for identifying and correcting suboptimal storage-reclamation processes, the method comprising:

receiving a reclamation report comprising reclamation statistics that span a period of time, where a first statistic of the reclamation statistics identifies:

a first user of a set of users, a time t1 that is comprised by the period of time, a first cumulative amount of reclaimable storage controlled by the first user, where the first cumulative amount of reclaimable storage consists of one or more logical units of storage identified by the first statistic as being reclaimable during a portion of the period of time ending at time t1, a first cumulative amount of reclaimed storage that has been reclaimed by the first user from the first cumulative amount of reclaimable storage during the portion of the period of time, and a first cumulative reclamation percent equal to the first cumulative amount of reclaimed storage divided by the first cumulative amount of reclaimable storage;

classifying, as a function the reclamation statistics, attempts by each user of the set of users to reclaim reclaimable storage during the period of time as being good, bad, improving, or declining;

determining, as a function of the classifying, that the first user has, during the period of time, made good or improving attempts to reclaim at least one logical unit of reclaimable storage;

further determining that the first user has failed to reduce the first user's cumulative reclamation percent during the period of time;

identifying, in response to the further determining, a suboptimal storage-reclamation process capable of causing the first user's failure to reduce the first user's cumulative reclamation percent during the period of time;

notifying one or more automated system-maintenance applications of the suboptimal storage-reclamation process; and directing the one or more automated system-maintenance applications to correct the suboptimal storage-reclamation process.

Yet another embodiment of the present invention provides a computer program product, comprising a computer-readable hardware storage device having a computer-readable program code stored therein, the program code configured to be executed by a storage-management system comprising a processor, a memory coupled to the processor, and a computer-readable hardware storage device coupled to the processor, the storage device containing program code configured to be run by the processor via the memory to implement a method for identifying and correcting suboptimal storage-reclamation processes, the method comprising:

receiving, by the processor, a reclamation report comprising reclamation statistics that span a period of time, where a first statistic of the reclamation statistics identifies:

a first user of a set of users, a time t1 that is comprised by the period of time, a first cumulative amount of reclaimable storage controlled by the first user, where the first cumulative amount of reclaimable storage consists of one or more logical units of storage identified by the first statistic as being reclaimable during a portion of the period of time ending at time t1, a first cumulative amount of reclaimed storage that has been reclaimed by the first user from the first cumulative amount of reclaimable storage during the portion of the period of time, and a first cumulative reclamation percent equal to the first cumulative mount of reclaimed storage divided by the first cumulative amount of reclaimable storage;

classifying, by the processor, as a function the reclamation statistics, attempts by each user of the set of users to reclaim reclaimable storage during the period of time as being good, bad, improving, or declining;

determining, by the processor, as a function of the classifying, that the first user has, during the period of time, made good or improving attempts to reclaim at least one logical unit of reclaimable storage;

further determining, by the processor, that the first user has failed to reduce the first user's cumulative reclamation percent during the period of time;

identifying, by the processor, in response to the further determining, a suboptimal storage-reclamation process capable of causing the first user's failure to reduce the first user's cumulative reclamation percent during the period of time; and rectifying, by the processor, the suboptimal storage-reclamation process.

DETAILED DESCRIPTION

Embodiments of the present invention improve the operation of storage-management and storage-reclamation systems by automatically identifying and correcting technical problems (or "suboptimal processes") that interfere with a user's attempts to reclaim orphaned logical units of computer storage. Such embodiments solve a technical problem that is necessarily rooted in computerized storage technology (the fact that technical issues may hamper users attempting to identify and reclaim lost units of storage) by means of a technical solution.

Known storage-management reclamation tools may fail due to the existence of abnormal conditions that cannot be easily anticipated or detected. Such abnormal conditions may occur for a variety of reasons, such as a failure of a client to act in response to a reported identification of reclaimable storage. There may also be technical reasons preventing the reclamation of storage, such as a failure of a storage-management system or a change-management process that causes storage to be erroneously allocated. In such cases, a user-administrator or an automatic storage-reclamation tool may be unable to prevent, or even detect, an ever-increasing accumulation of unreclaimed storage capacity.

There is thus a need for a way for storage-management systems and storage-reclamation tools to identify such abnormal reclamation behavior, and to automatically take steps to rectify such abnormalities. Because this is a technological problem that is necessarily rooted in a specific computerized technology, the problem must be solved by means of a technical solution that improves the performance and accuracy of a computerized storage-management system.

A storage-management system uses information received in one or more system-generated storage-reclamation logs to assign each user a set of reclamation scores. Each of these reclamation scores identifies how successful the user has been, through a particular time, when attempting to reclaim orphaned storage. The system organizes these scores into user-specific profiles that each consists of a chronological sequence of the reclamation scores associated with a particular user.

The storage-management system may characterize any of these profiles as being "good" (that is, if a user's scores are consistently high, indicating that the user has made significant, successful attempts to reclaim storage) or "improving" (the user's scores have increased over time, indicating the user's increasing success in reclaiming lost storage). The system then determines whether each "good" or "improving" user's reclamation efforts have successfully reduced the amount of reclaimable storage associated with the user over time.

If not, the system infers that a suboptimal process or other abnormal condition has been interfering with the user's reclamation efforts. In such cases, the system then undertakes corrective action intended to identify and resolve the suboptimal process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
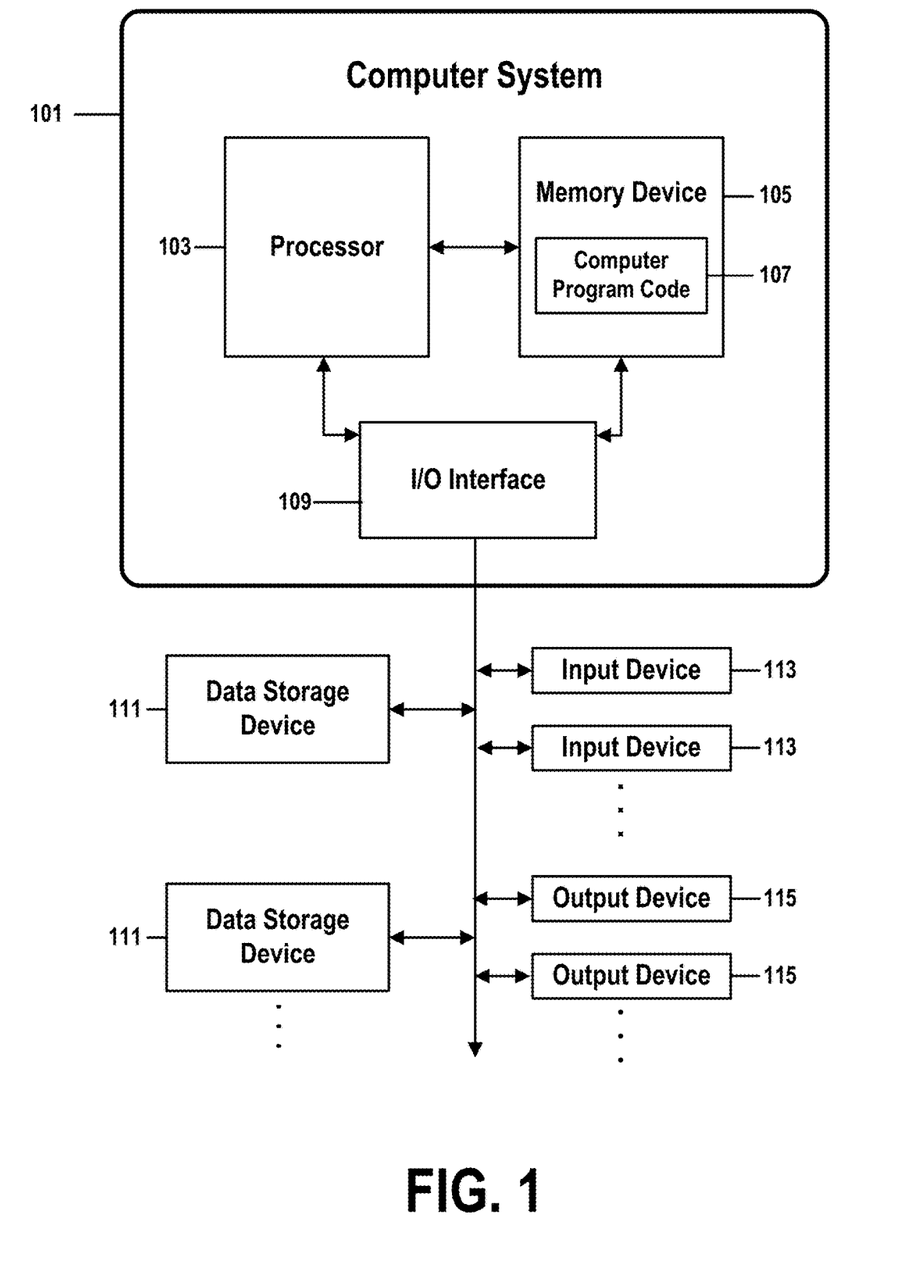
FIG. 1 shows the structure of a computer system and computer program code that may be used to implement a method for identifying and correcting suboptimal storage-reclamation processes in accordance with embodiments of the present invention.

FIG. 1 shows a structure of a computer system and computer program code that may be used to implement a method for identifying and correcting suboptimal storage-reclamation processes in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory-cards, SIM cards, or other types of memory devices.

At least one memory device 105 contains stored computer program code 107, which is a computer program that comprises computer-executable instructions. The stored computer program code includes a program that implements a method for identifying and correcting suboptimal storage-reclamation processes in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for identifying and correcting suboptimal storage-reclamation processes.

Any of the components of the present invention could be created, integrated, hosted, maintained, deployed, managed, serviced, supported, etc. by a service provider who offers to facilitate a method for identifying and correcting suboptimal storage-reclamation processes. Thus the present invention discloses a process for deploying or integrating computing infrastructure, comprising integrating computer-readable code into the computer system 101, wherein the code in combination with the computer system 101 is capable of performing a method for identifying and correcting suboptimal storage-reclamation processes.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for identifying and correcting suboptimal storage-reclamation processes may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for identifying and correcting suboptimal storage-reclamation processes is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown) where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
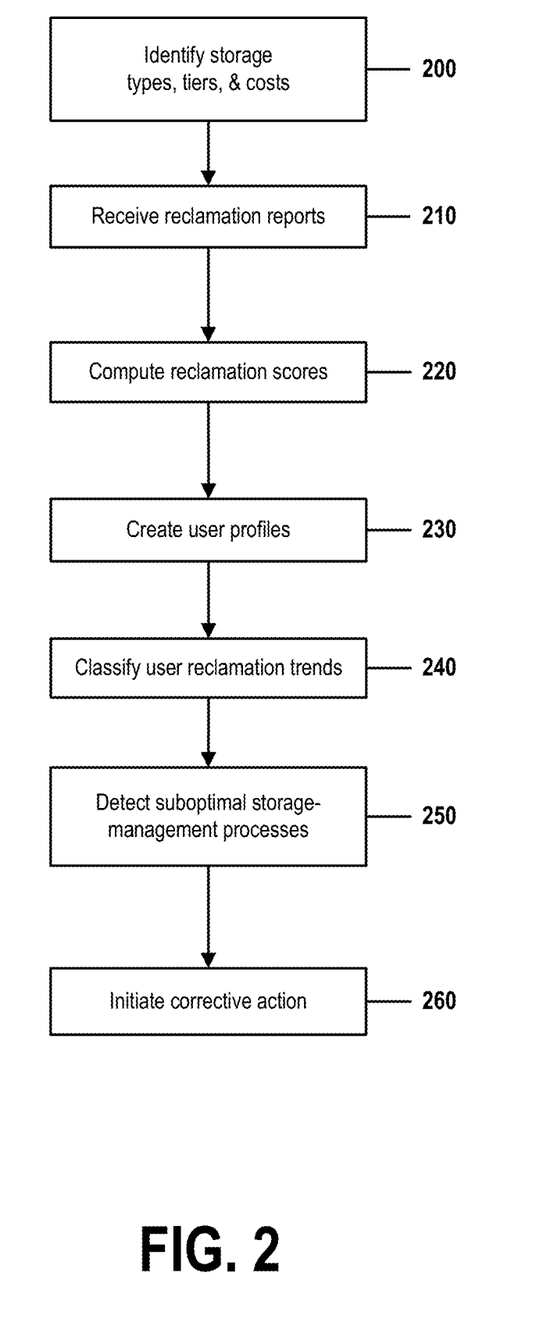
FIG. 2 is a flow chart that illustrates the steps of a method for identifying and correcting suboptimal storage-reclamation processes in accordance with embodiments of the present invention.

FIG. 2 is a flow chart that illustrates the steps of a method for identifying and correcting suboptimal storage-reclamation processes in accordance with embodiments of the present invention. FIG. 2 shows elements identified by reference numbers 200-260.

In step 200, a storage-management system receives information identifying, or identifies by other known means, information describing characteristics of computerized storage managed by the storage-management system.

The storage-management system may be any sort of system, utility, software tool, or application known in the art, enhanced by the present invention to comprise functionality for automatically identifying or correcting suboptimal storage-reclamation procedures.

A suboptimal storage-reclamation procedure is one that may not be successfully reclaiming storage identified by the storage-management system as being reclaimable. This failure to successfully reclaim storage may be caused by a variety of reasons. For example, a user administrator may not be performing known reclamation tasks in a timely manner or in a manner that conforms with generally accepted industry practices. In other cases, storage identified as being reclaimable may not be reclaimed because of a software bug or because of an incompatibility between two or more software entities, such as an incompatibility between the storage-management system and the operating system or hypervisor under which the storage-management system runs. Suboptimal reclamation may also occur when a condition occurs during which reclaimable storage accumulates more quickly than standard reclamation procedures can reclaim it. In yet other cases, a user's reclamation efforts may be thwarted by a hardware error, such as a corrupted disk drive that fails to notify a user that the user's attempt to reclaim storage has failed, or by an error in a change-management system or procedure that mischaracterizes a storage volume.

The information identified by the system in this step may characterize reclaimable storage in several ways. Firstly, it may identify categories of "orphaned logical unit numbers" (or "orphaned LUNs"), which are categories of logical volumes of storage that are inferred to be reclaimable because they cannot be accessed through normal methods by a host, administrator, or controller.

Table 1 illustrates one possible categorization of orphaned LUNs. This table should not be construed to limit embodiments of the present invention to only these categories. Embodiments of the present invention are flexible enough to accommodate any categorization scheme employed by a hardware or software vendor, a system administrator, or that may be otherwise desired by a user.

The example shown in Table 1 enumerates seven exemplary "types" of orphaned LUNs, each of which identifies one possible technical reason why a LUN may become orphaned, which may result in the LUN becoming reclaimable storage.

For example, in Table 1, reclaimable storage types 1, 2, and 7 are orphaned by problems related to a storage-array configuration, types 3 and 4 by problems with a switch configuration, and types 5 and 6 by server-configuration issues.

TABLE 1

| Type | Definition |
| --- | --- |
| 1 | LUN with storage-array configuration issue - not masked to a host |
| 2 | LUN with storage-array configuration issue - masked to a host that is not logged in to the array |
| 3 | LUN with switch configuration issue - masked to a host not zoned at the switch |
| 4 | LUN with switch configuration issue - zoned to a host not logged in to the switch |
| 5 | LUN with server configuration issue - zoned to a host but not under volume manager control |
| 6 | LUN with server configuration issue - zoned to a host and formatted as a file system on the host but empty |
| 7 | LUN with storage-array configuration issue - repurposed |

The system may also in step 200 receive information that associates a cost with each possible type of reclaimable storage. In the example of Table 1, reclaiming storage of types 5 and 6 might be more expensive than reclaiming types 1-4 or 7, since reclaiming types 5 and 6 may require making changes to a host, thus potentially disrupting a production environment.

The practice of organizing storage into tiers is a fundamental principle of nearly all modern storage-management and information-lifetime management systems. In such a system, the type of medium chosen to store a particular data set is selected as a function of requirements like storage-device performance, availability, and recovery. Data intended for recovery from a catastrophic data loss or database corruption might, for example, be stored locally, while data stored solely to satisfy a regulatory mandate might instead be archived to lower-cost, slower, write-only media.

These costs may also be a further function of the tier of the reclaimable storage. As is known in the art, storage devices may be organized into "tiers" as a function of their criticality, performance specifications, medium, or other parameters. For example, in a common type of three-tier system, Tier 0 might comprise high-performance, high-reliability, high-security storage devices intended for mission-critical data that must be retrieved with great speed, Tier 1 might comprise slower, larger media used to store less critical transactional data, and Tier 2 devices like high-capacity optical media, might be used solely for archiving.

Manufacturers have developed different tiering strategies that may organize storage into two, three, five, or even more tiers, and embodiments of the present invention are flexible enough to accommodate any storage-tiering structure.

Reclamation costs may depend upon the tier of the storage device from which storage is reclaimed. For example, reclaiming storage from a mission-critical Tier 0 system may be far more expensive than performing a similar reclamation from a Tier 2 archive repository because reclamation may require making critical information on the Tier 0 device inaccessible for an unacceptable period of time. However, a similar disruption of the Tier 2 device may have a negligible effect on the rest of the business. In other cases, costs for different tiers may differ because different-tier devices are hosted in different operating environments, on different network backbone segments, or on different network topologies.

Table 2 shows a partial example of how different costs may be incurred by reclamation tasks associated with different combinations of reclamation type and storage-device tier. This table shows only one possible set of costs and embodiments of the present invention may comprise any other combinations and costs. Note that there is no requirement that every type of reclamation may be possible for every tier. For example, in Table 2, only three reclamation types and associated costs are shown for each of Tier 1 storage devices and Tier 2 devices.

In general, a reclamation, expressed as a cost per unit of storage, for a particular combination of reclaimable storage type and tier, may be related to a relative reclamation difficulty. A higher reclamation cost for a particular reclamation type of cause and a particular storage tier thus generally implies a more difficult reclamation chore for that particular type and tier. These costs may be obtained by a user from a storage-device manufacturer or may be determined by reviewing past costs of previous reclamation efforts associated with different reclamation type and tier combinations.

TABLE 2

| Tier | Reclaim Type | Reclaim Cost/GB ($) |
|---|---|---|
| 1 | 1-LUNs | 2.31 |
| 1 | 2-LUNS | 3.02 |
| 1 | 7-LUNS | 3.83 |
| 2 | 2-LUNS | 1.78 |
| 2 | 3-LUNS | 2.63 |
| 2 | 6-LUNS | 6.45 |

In step 210, the system, using means known in the art, retrieves or generates one or more reclamation reports. One example of such a reclamation report is shown in Table 3.

Each reclamation report may tabulate information related to the cumulative amount of storage that has been capable of being reclaimed by a particular user through a particular time t. For example, if User 001 had been notified that 2 terabytes of User 001's storage were reclaimable in March 2015 (User 001's first month of operation) and that another 1 terabyte of User 001's storage was reclaimable in April 2015, a reclamation report might identify a cumulative total of 3 terabytes of User 001 cumulative reclaimable capacity as of May 1, 2015.

As shown in Table 3, a reclamation report may tabulate a distinct set of information for each user, for each recorded date or time t, and for each type/tier combination of reclaimable storage.

This set of information may include a cumulative reclaimed capacity for the user, reclamation type, and tier through a particular time t. For example, the first non-header line of Table 3 states that 5.4 TB of tier 1/reclamation-type 1 reclaimable storage had been reported to the user through Aug. 15, 2015.

Similarly, that line also reports that the user has reclaimed 1.2 TB of storage through Aug. 15, 2015 ("cumulative reclaimed storage"), identifies a $2.31 cost/GB of the reclaiming the reclaimable storage ("reclaim cost/GB"), and computes a 22.22% "cumulative reclaimed percentage" by dividing the cumulative reclaimed percentage by the cumulative reclaimable capacity.

In other embodiments, a reclamation report may comprise other or additional information, may describe a user's reclamation statistics through only one time t, or may describe reclamation statistics for more than one user. Regardless of the exact format of each reclamation report, at the conclusion of step 210, the system will have received information describing, or otherwise allowing the system to identify, every user's cumulative reclaimed storage capacity and cumulative reclaimed percentage for each relevant type/tier of reclaimable storage, through each of a sequence of times.

Embodiments of the present invention may accommodate receiving or generating any other format of reclamation report preferred by an implementer through any means known in the art of computerized storage management, so long as data comprised by the received report or reports allow the system to identify the above information. In some cases, the system will not need to receive the information described in step 200 because the system will be able to identify reclamation types, storage tiers, and reclamation costs solely from reclamation reports received or generated in step 210. In some embodiments, the storage-management tool will automatically generate one or more reclamation reports.

In step 220, the system uses information identified in steps 200 and 210 to compute a set of reclamation scores. If the reclamation reports received or generated in step 210 span a period of x times t(1) through t(x), the system will in step 220 compute a reclamation score for each user's cumulative reclamation statistics through each time of the x times. Each score will provide a general idea of how effectively a user c has accomplished its reclamation tasks through a particular time t.

Equation (1) computes a score for user c through time t in an embodiment that comprises m storage-reclamation types and n storage tiers.

$$score_c^t = \sum_{i=1}^{n} \sum_{j=1}^{m} W_{ij} \times CRP_{ij}^t \times \frac{CRC_{ij}^t}{\sum_{i=1}^{n} \sum_{j=1}^{m} CRC_{ij}^t} \quad (1)$$

$W_{ij}$, the first factor in Equation (1), represents a relative "reclamation difficulty" factor for reclaimable storage of tier i and type j. This factor may be optional in some cases, but including it in Equation (1) will make score computations more accurate.

An implementer may generate a reclamation difficulty factor through any known means, as a function of the implementer's expert knowledge of the storage system being managed, or as a function of a manufacturer's expert knowledge or general industry conventions related to operations of the storage system being managed.

In a simple example, an implementer may survey system-maintenance personnel or may consult maintenance logs to determine which combinations of storage tier and reclamation type incur relatively greater or lesser amounts of time or resources during a reclamation procedure. In other cases, an implementer may simply generate a base set of reclamation

TABLE 3

| Time | Tier | Reclaim Type | Cumulative Reclaimable Capacity (TB) | Reclaim Cost/GB($) | Cumulative Reclaimed Storage (TB) | Cumulative Reclaimed Percentage |
|---|---|---|---|---|---|---|
| 15-Aug-15 | 1 | 1-LUNs | 5.4 | 2.31 | 1.2 | 22.22% |
|  | 1 | 2-LUNs | 3.2 | 3.02 | 2.1 | 65.63% |
|  | 2 | 3-LUNs | 2.1 | 2.63 | 1.7 | 80.95% |
| 15-Sep-15 | 1 | 1-LUNs | 5.8 | 2.31 | 1.3 | 22.41% |
|  | 1 | 2-LUNs | 3.5 | 3.02 | 2.2 | 67.66% |
|  | 1 | 5-LUNs | 2.7 | 5.31 | 1.1 | 40.74% |
| 15-Oct-15 | 2 | 3-LUNs | 2.8 | 2.63 | 1.7 | 60.71% |
|  | 1 | 1-LUNs | 5.8 | 2.31 | 1.4 | 74.14% |
|  | 1 | 2-LUNs | 3.9 | 3.02 | 2.7 | 68.23% |
|  | 1 | 5-LUNs | 3.1 | 5.31 | 1.5 | 48.39% |
|  | 2 | 3-LUNs | 2.8 | 2.63 | 1.7 | 60.71% | difficulty factors that are proportional to corresponding reclamation costs. In all cases, reclamation difficulty scores may be normalized to fall within an inclusive range of 0.0 through 1.0.

In its simplest form, a set of reclamation difficulty factor for a particular storage tier and reclamation cost may be derived by simply normalizing the reclamation cost (as described in step 200) for that particular class of reclaimable storage. For example, if three classes of reclaimable storage are respectively associated with reclamation costs of $1/GB, $7/GB, and $2/GB, those reclaimable-storage classes may be associated, respectively, with difficulty factors of 0.1, 0.7, and 0.2.

The second term $CRP_{ij}^{t}$ of Equation (1) represents the cumulative reclaimed percentage (culled from the reclamation reports received or generated in step 210) for each reclaimable-storage type/tier combination through for user c. The product of the first two terms thus represents the percent of reclaimable storage $CRP_{ij}^{t}$ that was actually reclaimed by user c through time t, adjusted by a corresponding difficulty factor W. This adjustment assigns greater weight to a user's reclamation efforts when attempting to perform more difficult reclamation tasks.

$CRC_{ij}^{t}$ in the third term of Equation (1) denotes the cumulative reclaimable storage for each reclaimable storage type/tier combination through time t for user c. The denominator in the third term represents the total cumulative reclaimable storage for all tiers and all reclaimable storage types for user c through time t. The third term thus normalizes the cumulative reclaimable storage $CRC_{ij}^{t}$ into a value between 0 and 1.

The product of these three terms, summed over all reclaimable storage, regardless of storage tier or reclamation type for user c through time t produces a reclamation score $score_{c}^{t}$ for user c through time t. Greater values of this score roughly correspond to increasingly effective reclamation practices for user c through time t.

At the conclusion of step 220, the storage-management system will have used Equation (1) to manipulate information received in steps 200 and 210 to have computed a set of time-stamped scores for each user capable of reclaiming storage. In embodiments in which reclamation reports have not provided figures for every user at identical points in time, it is possible that one user may be associated with scores computed through different sets of time values.

In step 230, the storage-management system organizes user's each set of reclamation scores computed in step 220 into a user-specific reclamation profile. As shown in Eq. (2), a profile for any user c consists of a chronologically ordered sequence of user c's reclamation scores throughout a time period sampled at times $\{t1, t2, \ldots, T\}$, as reported in the reclamation reports for user c.

$$profile_c = \{score_c^{t1}, score_c^{t2}, \ldots, score_c^{T}\} \quad (2)$$

As will be described in step 240, a user's reclamation profile roughly corresponds to the user's relative effectiveness over time in reclaiming storage reported by the reclamation reports as being reclaimable. At the conclusion of step 230, the storage-management system will have created a reclamation profile for each user identified by any reclamation report received in step 210.

In step 240, the system uses the reclamation profiles generated in step 230 to characterize each user's overall effectiveness over time in reclaiming storage identified by the reclamation reports received in step 210.

The goal of this step is to identify users that appear to be properly performing their reclamation tasks. In step 250, the system will further determine whether these users' efforts are producing the desired reclamation results and, if not, the system will flag those users as being affected by factors that render those users' efforts suboptimal.

Figure 3:
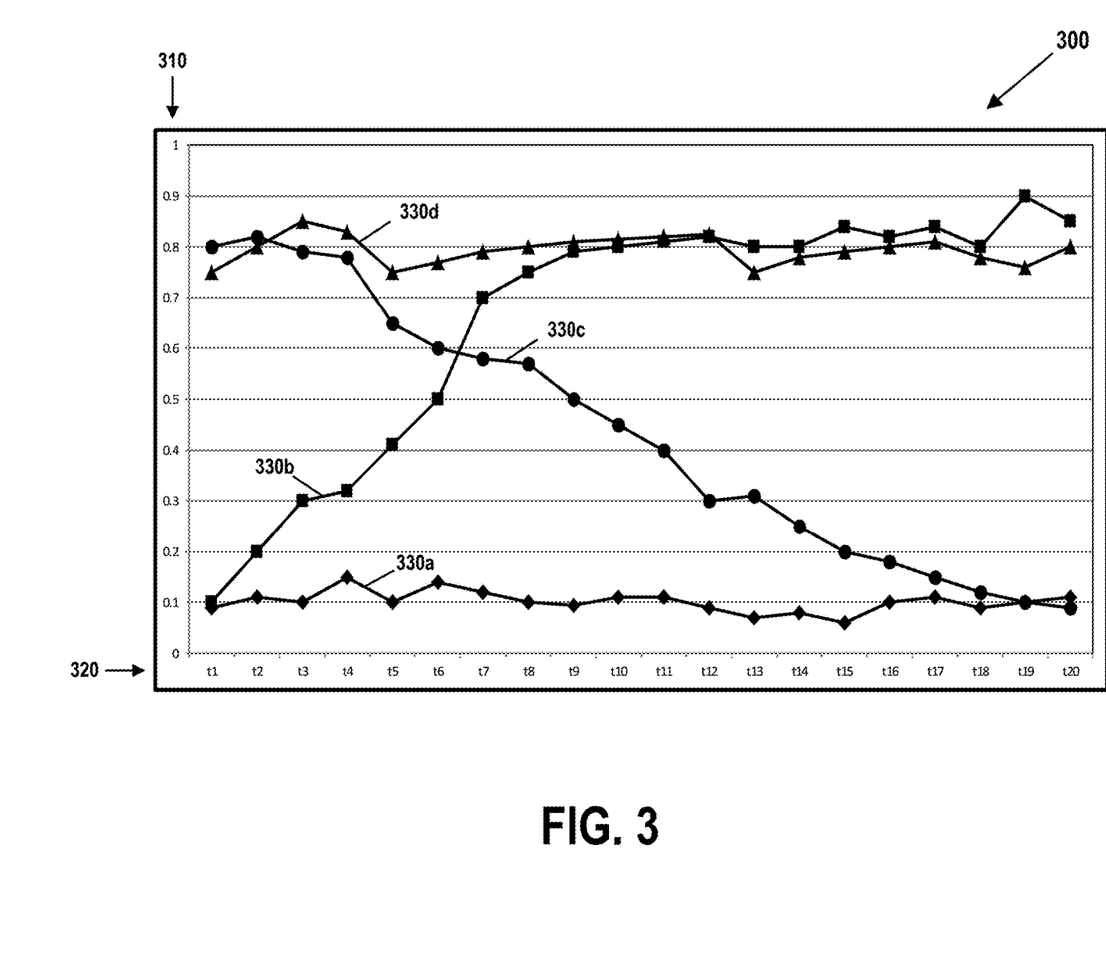
FIG. 3 illustrates results of FIG. 2, steps 230-240 as a graph of four exemplary user reclamation profiles.

The system attempts to perform this by identifying users that have relatively high reclamation scores or that have scores that have improved over time. In embodiments described in FIG. 2, the storage-management system performs this task by inferring a trendline from each user's reclamation profile. FIG. 3 shows a graph of four exemplary user profiles, from which such trendlines may be inferred.

Many ways of inferring such trendlines are known in the art. In one example, a trendline may be inferred from a user's reclamation profile performing a curve-smoothing operation (such as a moving-average smoothing function) upon the sequence of reclamation-score data points comprised by the profile, and then performing a standard linear-regression analysis upon the smoothed data.

This step may also be performed by any other means known in the art, as desired by an implementer. The curve-smoothing step, for example, may be omitted if the implementer considers it unnecessary to use smoothing to remove noise or to filter out outlying values that may affect the accuracy of a resulting trendline.

Solving the linear-regression analysis may identify a trendline curve for a user c that is capable of being expressed as a standard linear equation.

$$Y = AX + B \quad (3)$$

where X represents each time value t reported in user c's reclamation report and Y represents user c's corresponding reclamation score computed through the time t. As is known in the art, each A coefficient represents a slope of the trendline at a corresponding time X, and the B coefficient represents the Y-intercept of the trendline. A greater value of A therefore corresponds to a trendline that has a more positive slope and a greater value of B corresponds to an overall higher set of reclamation scores.

Characterizing a user's trendline requires comparing its slope A and intercept B to predetermined threshold values. If a user's trendline is characterized by a positive enough slope (that is, if the value of coefficient A in Equation (3) exceed a threshold value) the trendline's chronologically increasing reclamation scores may indicate that the user's performance of storage-reclamation tasks is "improving." Similarly, if the user's trendline has a flatter slope but still comprises reclamation scores that are sufficiently high (that is, if the absolute value of A falls below a first predetermined threshold value, but the value of B exceeds a second predetermined threshold), then the trendline may be considered to indicate that the user's performance of storage-reclamation tasks is "good" overall. The method of FIG. 2 attempts to identify "good" and "improving" users in this step.

Embodiments of the present invention are flexible enough to allow implementers to select these threshold values by any means known in the art. These values may be set, for example, as a function of industry conventions, business requirements, or technical constraints, or may be selected by a skilled implementer who possesses expert knowledge of the business or computing environment being managed by the storage-management system.

In a simple example, a user may choose to deem a user's reclamation performance to be "improving" if the slope A of the user's trendline exceeds a value of 1.0, and may deem a user's reclamation performance to be "good" if the slope A of the user's trendline falls within a range of −0.1 through +0.1 and the y-intercept B is greater than 0.5.

Embodiments of the present invention are flexible enough to accommodate selecting many other threshold values by whatever means desired by an implementer. Furthermore, in embodiments wherein implementers fine-tune the threshold values after each iteration of the method of FIG. 2, an initial choice of a threshold value may not be crucial.

For example, if the selection a 1.0 threshold slope value A results in characterizing no users as having "good" reclamation practices, an implementer, or the system itself, may automatically decrement the threshold value before again practicing the present invention. Similarly, if a 1.0 threshold slope value results in characterizing nearly all users as having "good" reclamation practices, that value might instead be incremented. In either case, if the next iteration still fails to produce acceptable results, the implementer might again similarly revise the threshold value, and continue to do so in a similar manner after each subsequent iteration, until the system has been fine-tuned to produce accurate results, or to produce results that converge to an optimal value regardless of further fine-tuning. Such an approach can thus select optimal threshold values, regardless of which threshold values were initially selected.

At the conclusion of step 240, the storage-management system will have identified a first set of users that appear to be practicing "good" storage-recommendation practices, and a second set of users whose storage-recommendation practices seem to be "improving."

In step 250, the storage-management system determines whether each user selected in step 240 as having "good" or "improving" reclamation practices are associated with abnormal or "suboptimal" storage-management results. If such suboptimal results occur despite a user's good or improving behavior, the system flags those users as being candidates for closer examination.

Because the reclamation scores of the users selected in the previous step are either relatively high and stable over time (.i.e., "good" behavior) or steadily improving throughout a predetermined time window (i.e., "improving" behavior), those users are understood to have taken active steps to reclaim storage identified by the reclamation reports as being reclaimable.

For such users, the percent of total reclaimable storage should thus be decreasing over time. However, a malfunctioning, or abnormal "suboptimal" storage-management process may thwart a user's best reclamation efforts, resulting in that user's percent of reclaimable storage increasing, remaining stable, or decreasing only slightly over time.

In this step, the system, for each user selected in step 240, plots or graphs that user's cumulative reclaimed percentage of reclaimable storage $CRP_{ij}^t$ through each time t reported in the user's reclamation reports. As with the reclamation profiles above, a trendline may be inferred from the resulting curve through known mathematical techniques that may comprise a curve-smoothing function or a linear-regression analysis. Similarly, as above, a resulting trendline may be characterized as either "normal" or "suboptimal" as a function of its slope coefficient A. If the value of the trendline's coefficient A is negative and exceeds a threshold magnitude, the user is deemed to be successfully reducing the user's amount of reclaimable storage over time. If, however, the trendline's slope coefficient A has a value greater than the threshold value—indicating a suboptimal storage-management reclamation process—then the system may infer that the user has not been successful over time in reducing its cumulative amount of reclaimable storage.

If a user has been practicing good or improving storage-reclamation procedures, such a suboptimal management process may indicate that an extrinsic factor is preventing the user's best efforts from being effective.

As in step 240's threshold-selection steps, a threshold value for the slope of the trendline generated in step 250 may be selected by any means known in the art. For example, an implementer may set a goal that all users' cumulative percentage decline on average by 5% each month. But if a business wishes to more aggressively address known storage-reclamation problems, this threshold value may be set higher, thus associating a greater number of users with suboptimal reclamation processes. Furthermore, as in step 240, an implementer may simply select an arbitrary initial threshold value, adjusting the value with each iteration of the method, through manual or automated means, until the threshold value produces satisfactory results. Embodiments of the present invention are flexible enough to accommodate any threshold value selected by an implementer possessed of expert knowledge of the business, computing environment, or storage devices being managed by the storage-management system.

At the conclusion of step 250, the system will have identified users whose reclaimable storage is not decreasing at a desired rate, despite those users' attempts to practice recommended storage-reclamation procedures. The system characterizes those users as being associated with a suboptimal storage-reclamation process that may result in failures of the users' efforts to reclaim storage.

In step 260, the storage-management system initiates corrective action intended to resolve the causes of the suboptimal procedures identified in step 250.

This corrective action may comprise any techniques, technologies, procedures, or conventions known in the art. In a simple example, the system may merely notify a user or a person responsible for storage maintenance that certain users' storage-reclamation efforts are being hampered by an identified or unidentified suboptimal process.

In more sophisticated implementations, the system may automatically run diagnostics on the storage media, devices, or controllers associated with the suboptimal process, or on the network, infrastructure, host systems, or other related hardware or software that may be related to the suboptimal process. These tasks may be performed by any means known in the art, including any such diagnostics capable of being run manually or automatically by known system-maintenance, network-maintenance, cloud-management, operating system, software-optimization, or compliance-management utilities or applications.

The storage-management system of the present invention might also analyze maintenance logs that identify when and how a user attempted to reclaim storage in the past, in order to determine whether a user's suboptimal storage-reclamation processes are the result of user error. In yet another example, the system may analyze error logs or configuration files capable of revealing hardware problems, software-configuration or compatibility issues, system-configuration or compatibility issues, or user-triggered error conditions that might contribute to a suboptimal storage-reclamation process.

Embodiments of the present invention are flexible enough to accommodate these and any other diagnostic or prognostic steps desired by an implementer.

In all cases, the system, after identifying a possible cause of a suboptimal storage-reclamation process, may attempt to automatically resolve the problem by means known in the art, or may merely report suspected problems to a user or administrator. In a fully realized embodiment, the storage-management system, after identifying users likely to be experiencing suboptimal storage-reclamation issues, automatically identifies and corrects a likely cause of those issues.

FIG. 3 illustrates results of FIG. 2, steps 230-240 as a graph of four exemplary user reclamation profiles. FIG. 3 identifies items 300-330*d*.

In this example, reclamation profiles for four users have been generated by a method of FIG. 2, step 230. Each row of Table 4 shows each user's reclamation score at a particular time t ∈ {t1, t2, . . . , t20}. Each column represents one user's set of reclamation scores, organized chronologically through the period of time spanned by t1 . . . t20.

TABLE 4

| Time | User1 | User2 | User3 | User4 |
|------|-------|-------|-------|-------|
| t1 | 0.09 | 0.1 | 0.75 | 0.8 |
| t2 | 0.11 | 0.2 | 0.8 | 0.82 |
| t3 | 0.1 | 0.3 | 0.85 | 0.79 |
| t4 | 0.15 | 0.32 | 0.83 | 0.78 |
| t5 | 0.1 | 0.41 | 0.75 | 0.65 |
| t6 | 0.14 | 0.5 | 0.77 | 0.6 |
| t7 | 0.12 | 0.7 | 0.79 | 0.58 |
| t8 | 0.1 | 0.75 | 0.8 | 0.57 |
| t9 | 0.1 | 0.79 | 0.81 | 0.5 |
| t10 | 0.11 | 0.8 | 0.815 | 0.45 |
| t11 | 0.11 | 0.81 | 0.82 | 0.4 |
| t12 | 0.09 | 0.82 | 0.825 | 0.3 |
| t13 | 0.07 | 0.8 | 0.75 | 0.31 |
| t14 | 0.08 | 0.8 | 0.78 | 0.25 |
| t15 | 0.06 | 0.84 | 0.79 | 0.2 |
| t16 | 0.1 | 0.82 | 0.8 | 0.18 |
| t17 | 0.11 | 0.84 | 0.81 | 0.15 |
| t18 | 0.09 | 0.8 | 0.78 | 0.12 |
| t19 | 0.1 | 0.9 | 0.76 | 0.1 |
| t20 | 0.11 | 0.85 | 0.8 | 0.09 |

FIG. 3 illustrates four trendline curves generated respectively from each column of reclamation scores in Table 4. The four curves have been graphed in a comparative reclamation-profile chart 300. User1's profile is represented by curve 330*a*, User2's profile is represented by curve 330*b*, User3's profile is represented by curve 330*c*, and User4's profile is represented by curve 330*d*. The y-scale 310 of chart 300 is tabulated in units of normalized reclamation scores, ranging inclusively from the values 0.0 through 1.0. The x-scale 320 of chart 300 is tabulated in units of time, ranging from t1 through t20.

In this example, using the procedures described in step 240, trendline 330*a* would be determined to be "not good" because it shows User1 as being unsuccessful at reclaiming storage over time. Such a trendline, if expresses as a linear equation, would have low value of coefficient A (slope) and a low value of Y-intercept B.

User2's trendline 330*b* is "improving" because it has steeper slope A, indicating that User2's reclamation efforts have become increasingly successful over time.

User3's trendline 330*c* is considered to be "declining" because it represents reclamation scores that are decreasing over time, and is characterized by a negative slope A. User3's reclamation scores may be declining for a number of reasons, such as technical or budget constraints, or may be declining because User3 is not following recommended reclamation procedures.

User4's trendline 330*d* is "good" because it represents relatively high reclamation scores that are relatively stable over time, and is characterized by a flatter slope A and a higher value of B. The storage-management system may assume that "good" User4 has been consistently acting to reclaim storage identified by past reclamation reports.

The system in step 240 would thus select "improving" User2 and "good" User4 for additional analysis in step 250.

What is claimed is:

1. A storage-management system comprising a processor, a memory coupled to the processor, and a computer-readable hardware storage device coupled to the processor, the storage device containing program code configured to be run by the processor via the memory to implement a method for identifying and correcting suboptimal storage-reclamation processes, the method comprising:

receiving, by the processor, a reclamation report comprising reclamation statistics that span a period of time, where a first statistic of the reclamation statistics identifies:
a first user of a set of users,
a time t1 that is comprised by the period of time,
a first cumulative amount of reclaimable storage controlled by the first user, where the first cumulative amount of reclaimable storage consists of one or more logical units of storage identified by the first statistic as being reclaimable during a portion of the period of time ending at time t1,
a first cumulative amount of reclaimed storage that has been reclaimed by the first user from the first cumulative amount of reclaimable storage during the portion of the period of time, and
a first cumulative reclamation percent equal to the first cumulative amount of reclaimed storage divided by the first cumulative amount of reclaimable storage;

classifying, by the processor, as a function of the reclamation statistics, attempts by each user of the set of users to reclaim reclaimable storage during the period of time as being good, bad, improving, or declining;

determining, by the processor, as a function of the classifying, that the first user has, during the period of time, made good or improving attempts to reclaim at least one logical unit of reclaimable storage;

further determining, by the processor, that the first user has failed to reduce the first user's cumulative reclamation percent during the period of time;

identifying, by the processor, in response to the further determining, a suboptimal storage-reclamation process capable of causing the first user's failure to reduce the first user's cumulative reclamation percent during the period of time; and rectifying, by the processor, the suboptimal storage-reclamation process.

2. The system of claim 1,
where a first logical unit of the cumulative amount of reclaimable storage is characterized by a corresponding tier of a set of storage tiers and a corresponding reclamation type of a set of reclamation types,
where each tier of the set of storage tiers identifies a general performance class of storage devices,
where each reclamation type of the set of reclamation types identifies a general class of problem capable of rendering a logical unit of storage reclaimable, and
where reclaiming the first logical unit incurs a reclamation cost that is associated with the corresponding tier and the corresponding type.

3. The system of claim 1, where the classifying further comprises:
computing, by the processor, for each statistic of the reclamation statistics, a reclamation score for a corresponding user of the set of users at a time t2 comprised by the period of time, where the reclamation score characterizes the first user's cumulative reclamation success rate through time t2 when attempting to reclaim storage;

creating, by the processor, a set of reclamation profiles that each comprises a chronologically ordered sequence of reclamation scores for one user of the set of users throughout the period of time;

inferring, by the processor, from a first profile of the set of reclamation profiles that reclamation scores, of a profiled user of the set of users, comprised by the first profile follow a trend that satisfies one or more conditions of a set of predetermined conditions; and characterizing, by the processor, as a function of the inferring, attempts made during the period of time by the profiled user as being good, bad, improving, or declining.

4. The system of claim 3, where a user of the set of users whose reclamation scores follow a trend of consistently falling above a first predefined threshold value is characterized as "good,"

where a user of the set of users whose reclamation scores follow a trend of consistently falling below a second predefined threshold value is characterized as "bad,"

where a user of the set of users whose reclamation scores follow a trend of increasing over time is characterized as "improving," and where a user of the set of users whose reclamation scores follow a trend of decreasing over time is characterized as "declining".

5. The system of claim 3, where the first user's reclamation score at time t1 is computed as a product of three terms summed over all combinations of tiers of the set of storage tiers and reclamation types of the set of reclamation types, where the first term of the three terms is a reclamation difficulty factor that corresponds to the reclamation cost associated with a particular combination of reclamation type and storage tier, where the second term of the three terms is the first cumulative reclamation percent for the first user at time t1, and where the third term of the three terms is a normalization term that expresses a cumulative amount of reclaimable storage, for the first user through time t, that is associated with only the particular combination of tier and reclamation type, as a percent of a cumulative amount of reclaimable storage, for the first user through time t, regardless of storage tier or reclamation type.

6. The system of claim 1, where the rectifying comprises:

notifying, by the processor, one or more automated system-maintenance applications of the suboptimal storage-reclamation process; and directing, by the processor, the one or more automated system-maintenance applications to correct the suboptimal storage-reclamation process.

7. The system of claim 1, where the rectifying comprises:

notifying, by the processor, a management component of a computing platform that hosts the reclaimable storage of the suboptimal storage-reclamation process; and directing, by the processor, the management component to rectify the suboptimal storage-reclamation process.

8. A method for identifying and correcting suboptimal storage-reclamation processes, the method comprising:

receiving a reclamation report comprising reclamation statistics that span a period of time, where a first statistic of the reclamation statistics identifies:

a first user of a set of users, a time t1 that is comprised by the period of time, a first cumulative amount of reclaimable storage controlled by the first user, where the first cumulative amount of reclaimable storage consists of one or more logical units of storage identified by the first statistic as being reclaimable during a portion of the period of time ending at time t1, a first cumulative amount of reclaimed storage that has been reclaimed by the first user from the first cumulative amount of reclaimable storage during the portion of the period of time, and a first cumulative reclamation percent equal to the first cumulative amount of reclaimed storage divided by the first cumulative amount of reclaimable storage;

classifying, as a function of the reclamation statistics, attempts by each user of the set of users to reclaim reclaimable storage during the period of time as being good, bad, improving, or declining;

determining, as a function of the classifying, that the first user has, during the period of time, made good or improving attempts to reclaim at least one logical unit of reclaimable storage;

further determining that the first user has failed to reduce the first user's cumulative reclamation percent during the period of time;

identifying, in response to the further determining, a suboptimal storage-reclamation process capable of causing the first user's failure to reduce the first user's cumulative reclamation percent during the period of time;

notifying one or more automated system-maintenance applications of the suboptimal storage-reclamation process; and directing the one or more automated system-maintenance applications to correct the suboptimal storage-reclamation process.

9. The method of claim 8, where a first logical unit of the cumulative amount of reclaimable storage is characterized by a corresponding tier of a set of storage tiers and a corresponding reclamation type of a set of reclamation types, where each tier of the set of storage tiers identifies a general performance class of storage devices, where each reclamation type of the set of reclamation types identifies a general class of problem capable of rendering a logical unit of storage reclaimable, and where reclaiming the first logical unit incurs a reclamation cost that is associated with the corresponding tier and the corresponding type.

10. The method of claim 8, where the classifying further comprises:

computing, for each statistic of the reclamation statistics, a reclamation score for a corresponding user of the set of users at a time t2 comprised by the period of time, where the reclamation score characterizes the first user's cumulative reclamation success rate through time t2 when attempting to reclaim storage;

creating a set of reclamation profiles that each comprise a chronologically ordered sequence of reclamation scores for one user of the set of users throughout the period of time;

inferring from a first profile of the set of reclamation profiles that reclamation scores, of a profiled user of the set of users, comprised by the first profile follow a trend that satisfies one or more conditions of a set of predetermined conditions; and characterizing, as a function of the inferring, attempts made during the period of time by the profiled user as being good, bad, improving, or declining.

11. The method of claim 10,
where a user of the set of users whose reclamation scores follow a trend of consistently falling above a first predefined threshold value is characterized as "good,"
where a user of the set of users whose reclamation scores follow a trend of consistently falling below a second predefined threshold value is characterized as "bad,"
where a user of the set of users whose reclamation scores follow a trend of increasing over time is characterized as "improving," and
where a user of the set of users whose reclamation scores follow a trend of decreasing over time is characterized as "declining".

12. The method of claim 10,
where the first user's reclamation score at time t1 is computed as a product of three terms summed over all combinations of tiers of the set of storage tiers and reclamation types of the set of reclamation types,
where the first term of the three terms is a reclamation difficulty factor that corresponds to the reclamation cost associated with a particular combination of reclamation type and storage tier,
where the second term of the three terms is the first cumulative reclamation percent for the first user at time t1, and
where the third term of the three terms is a normalization term that expresses a cumulative amount of reclaimable storage, for the first user through time t, that is associated with only the particular combination of tier and reclamation type, as a percent of a cumulative amount of reclaimable storage, for the first user through time t, regardless of storage tier or reclamation type.

13. The method of claim 8, further comprising providing at least one support service for at least one of creating, integrating, hosting, maintaining, and deploying computer-readable program code in the computer system, wherein the computer-readable program code in combination with the computer system is configured to implement the receiving, the classifying, the determining, the further determining, the identifying, the notifying, and the directing.

14. A computer program product, comprising a computer-readable hardware storage device having a computer-readable program code stored therein, the program code configured to be executed by a storage-management system comprising a processor, a memory coupled to the processor, and a computer-readable hardware storage device coupled to the processor, the storage device containing program code configured to be run by the processor via the memory to implement a method for identifying and correcting suboptimal storage-reclamation processes, the method comprising:
receiving, by the processor, a reclamation report comprising reclamation statistics that span a period of time, where a first statistic of the reclamation statistics identifies:
a first user of a set of users,
a time t1 that is comprised by the period of time,
a first cumulative amount of reclaimable storage controlled by the first user, where the first cumulative amount of reclaimable storage consists of one or more logical units of storage identified by the first statistic as being reclaimable during a portion of the period of time ending at time t1,
a first cumulative amount of reclaimed storage that has been reclaimed by the first user from the first cumulative amount of reclaimable storage during the portion of the period of time, and
a first cumulative reclamation percent equal to the first cumulative amount of reclaimed storage divided by the first cumulative amount of reclaimable storage;
classifying, by the processor, as a function of the reclamation statistics, attempts by each user of the set of users to reclaim reclaimable storage during the period of time as being good, bad, improving, or declining;
determining, by the processor, as a function of the classifying, that the first user has, during the period of time, made good or improving attempts to reclaim at least one logical unit of reclaimable storage;
further determining, by the processor, that the first user has failed to reduce the first user's cumulative reclamation percent during the period of time;
identifying, by the processor, in response to the further determining, a suboptimal storage-reclamation process capable of causing the first user's failure to reduce the first user's cumulative reclamation percent during the period of time; and
rectifying, by the processor, the suboptimal storage-reclamation process.

15. The computer program product of claim 14,
where a first logical unit of the cumulative amount of reclaimable storage is characterized by a corresponding tier of a set of storage tiers and a corresponding reclamation type of a set of reclamation types,
where each tier of the set of storage tiers identifies a general performance class of storage devices,
where each reclamation type of the set of reclamation types identifies a general class of problem capable of rendering a logical unit of storage reclaimable, and
where reclaiming the first logical unit incurs a reclamation cost that is associated with the corresponding tier and the corresponding type.

16. The computer program product of claim 14, where the classifying further comprises:
computing, by the processor, for each statistic of the reclamation statistics, a reclamation score for a corresponding user of the set of users at a time t2 comprised by the period of time, where the reclamation score characterizes the first user's cumulative reclamation success rate through time t2 when attempting to reclaim storage;
creating, by the processor, a set of reclamation profiles that each comprise a chronologically ordered sequence of reclamation scores for one user of the set of users throughout the period of time;
inferring, by the processor, from a first profile of the set of reclamation profiles that reclamation scores, of a profiled user of the set of users, comprised by the first profile follow a trend that satisfies one or more conditions of a set of predetermined conditions; and
characterizing, by the processor, as a function of the inferring, attempts made during the period of time by the profiled user as being good, bad, improving, or declining.

17. The computer program product of claim 16,
where a user of the set of users whose reclamation scores follow a trend of consistently falling above a first predefined threshold value is characterized as "good,"
where a user of the set of users whose reclamation scores follow a trend of consistently falling below a second predefined threshold value is characterized as "bad,"

where a user of the set of users whose reclamation scores follow a trend of increasing over time is characterized as "improving," and where a user of the set of users whose reclamation scores follow a trend of decreasing over time is characterized as "declining".

18. The computer program product of claim 16, where the first user's reclamation score at time t1 is computed as a product of three terms summed over all combinations of tiers of the set of storage tiers and reclamation types of the set of reclamation types, where the first term of the three terms is a reclamation difficulty factor that corresponds to the reclamation cost associated with a particular combination of reclamation type and storage tier, where the second term of the three terms is the first cumulative reclamation percent for the first user at time t1, and where the third term of the three terms is a normalization term that expresses a cumulative amount of reclaimable storage, for the first user through time t, that is associated with only the particular combination of tier and reclamation type, as a percent of a cumulative amount of reclaimable storage, for the first user through time t, regardless of storage tier or reclamation type.

19. The computer program product of claim 14, where the rectifying comprises:

notifying, by the processor, one or more automated system-maintenance applications of the suboptimal storage-reclamation process; and directing, by the processor, the one or more automated system-maintenance applications to correct the suboptimal storage-reclamation process.

20. The computer program product of claim 14, where the rectifying comprises:

notifying, by the processor, a management component of a computing platform that hosts the reclaimable storage of the suboptimal storage-reclamation process; and directing, by the processor, the management component to rectify the suboptimal storage-reclamation process.

* * * * *